United States Patent [19]

Rigsby

[11] Patent Number: 5,007,135
[45] Date of Patent: Apr. 16, 1991

[54] PLANT GROWING RECEPTACLE

[76] Inventor: Robert Rigsby, 18671 Palm Creek Dr., Ft. Myers, Fla. 33917

[21] Appl. No.: 539,885

[22] Filed: Jun. 18, 1990

[51] Int. Cl.$^5$ .................. A01G 9/02; A01G 27/00
[52] U.S. Cl. ........................................ 47/73; 47/79; 47/66
[58] Field of Search ................ 47/73, 77, 66, 79

[56] References Cited

U.S. PATENT DOCUMENTS

| | | | |
|---|---|---|---|
| 592,066 | 10/1897 | Simpson | 47/73 |
| 2,594,307 | 4/1952 | Valenzuela | 47/73 |
| 3,085,364 | 4/1963 | Chapin | 47/79 X |
| 3,108,400 | 10/1963 | Wolfe | 47/79 X |
| 3,195,272 | 7/1965 | Mosher | 47/73 |
| 3,785,088 | 1/1979 | Guarrillo | 47/66 |
| 3,800,469 | 4/1974 | Lau, Jr. et al. | 47/66 |
| 4,059,921 | 11/1977 | Moriwaki | 47/73 |
| 4,154,025 | 5/1979 | Costanzo | 47/73 X |
| 4,715,144 | 12/1987 | Lee | 47/73 |

FOREIGN PATENT DOCUMENTS

| | | | |
|---|---|---|---|
| 495242 | 8/1950 | Belgium | 47/73 |
| 2433036 | 1/1976 | Fed. Rep. of Germany | 47/66 |
| 633293 | 1/1928 | France | 47/73 |

Primary Examiner—David A. Scherbel
Assistant Examiner—Jerrold D. Johnson
Attorney, Agent, or Firm—Frank P. Cyr

[57] ABSTRACT

A plant growing receptacle to be employed particularly by commercial nurseries wherein numerous plants are cultivated for future sale to the purchasing public. The container is readily adaptable for use with a variety of plants and includes a conical body made of a molded plastic which includes a side wall and an integral bottom wall. A pair of diametrically opposed openings are formed in the side wall, and are adapted to receive a root from the growing plant therein and are positioned along the lower portion of the side walls. Also, drain openings are formed in the side wall, slightly above the bottom wall of the container and below the root receiving openings. The receptacle may be used as effectively for placement into the soil which has been previously mechanically drilled to receive the same, or used above ground when placed on an impervious base such as a plastic sheet or the like.

6 Claims, 3 Drawing Sheets

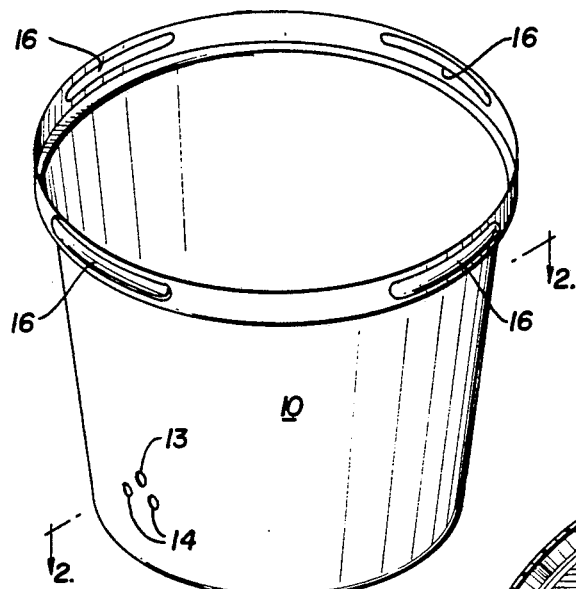
FIG.1
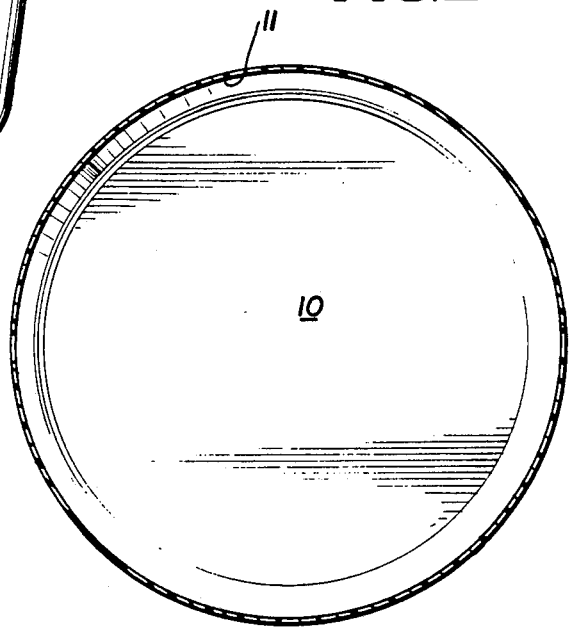
FIG.2
FIG.4
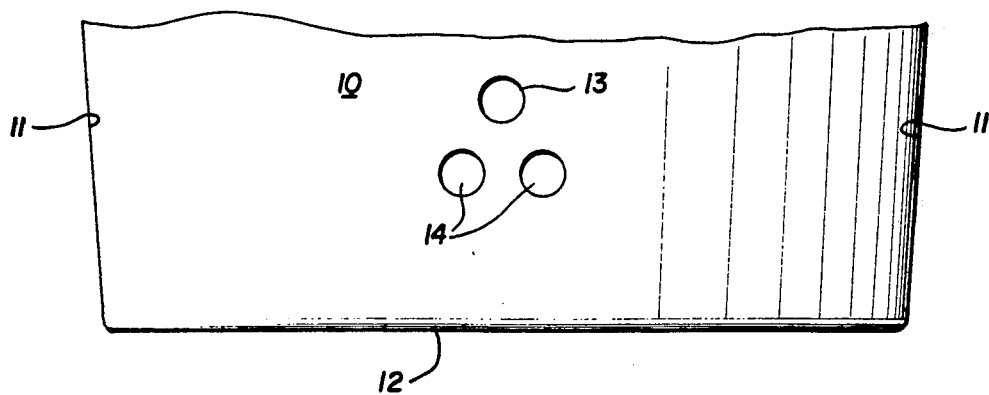

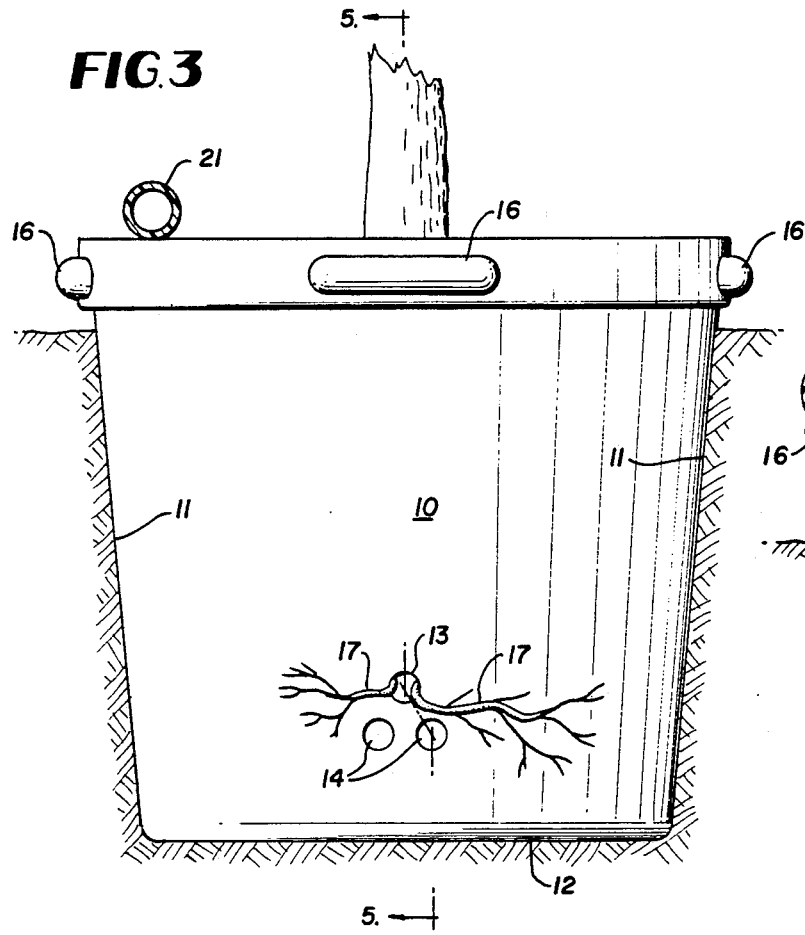
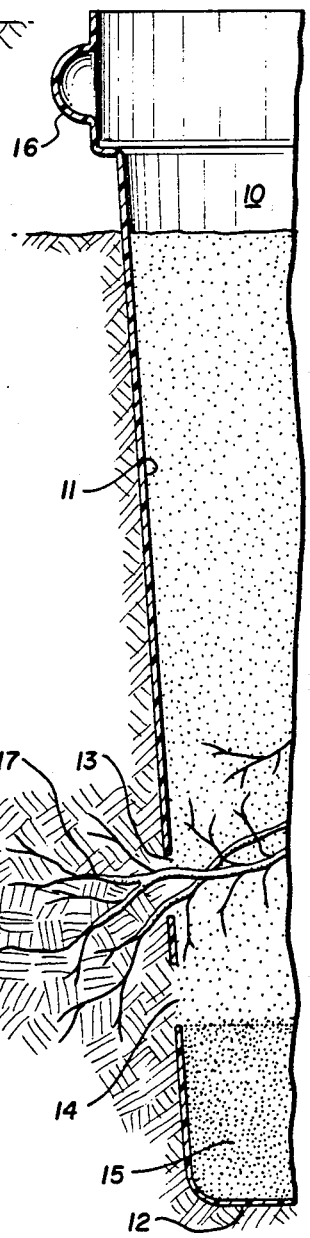
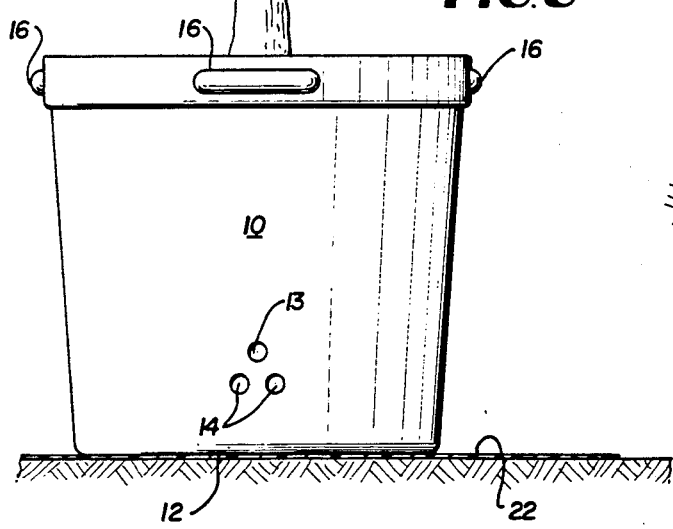
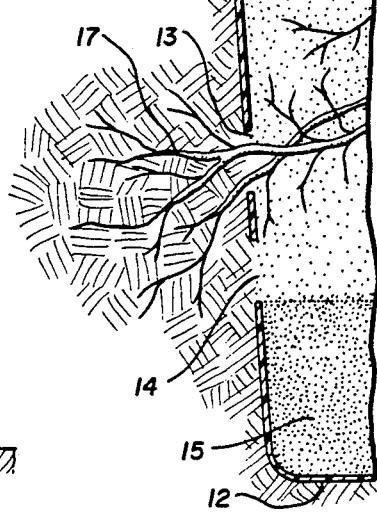

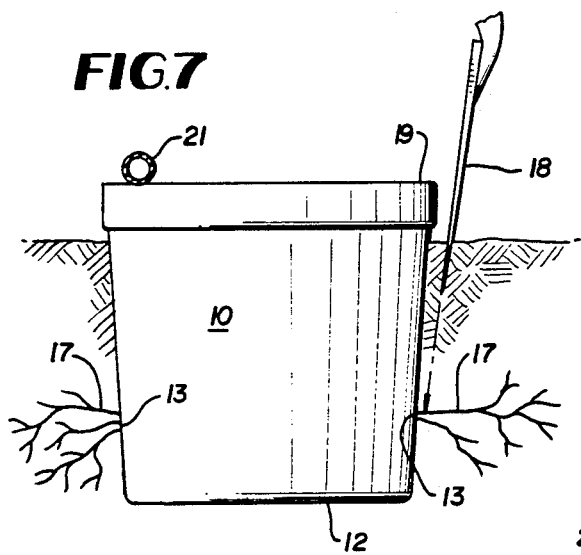
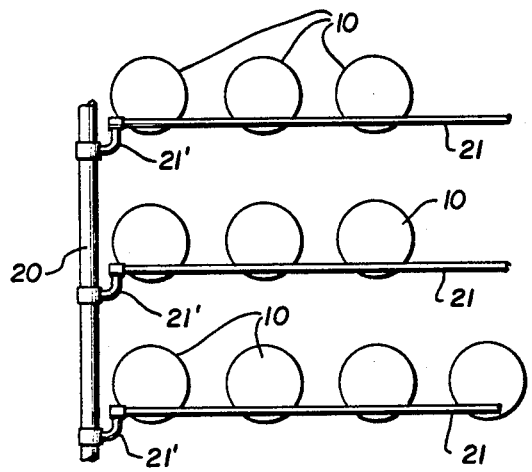
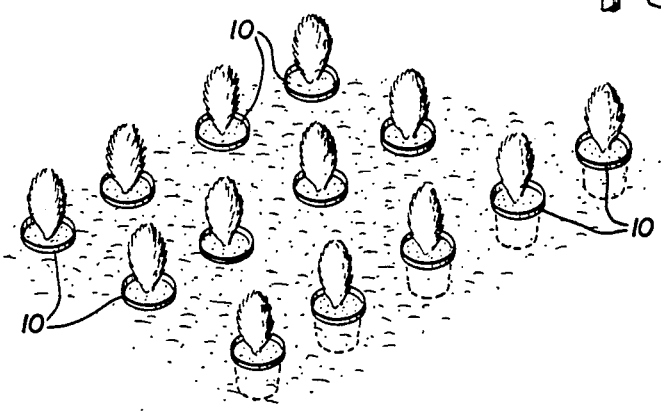
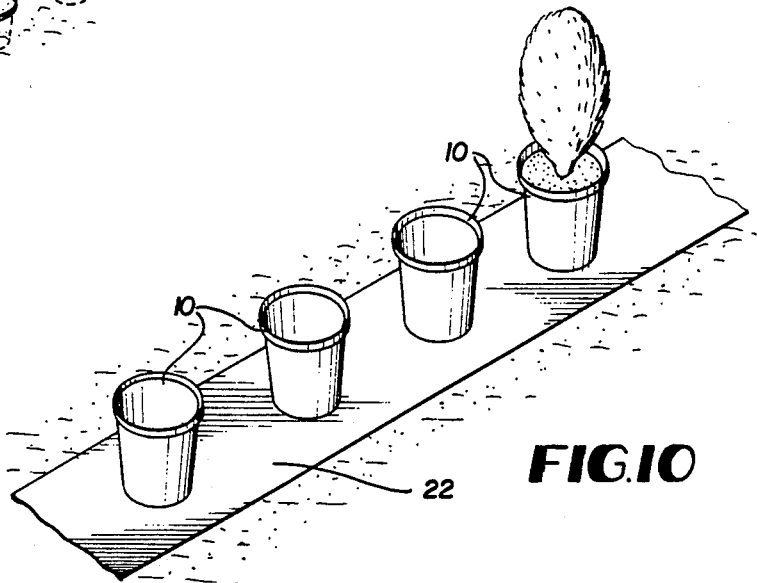

PLANT GROWING RECEPTACLE

BACKGROUND OF THE INVENTION

In recent years there has been considerable activity in the development of a suitable container for the growing of plants, particularly by nursery owners. However, no container has been devised where the same may be employed either for placement in the soil or above ground placement to promote the growth therein of a healthy plant. No prior container has been devised so as to insure a steady available source of moisture necessary for the continued growth of the plant placed therein. Also, no previous container has been constructed which will permit the container to be placed in an opening in the soil which has diametrically opposed openings found in the lower portion of the side wall of the container which will allow some of the roots of the plant to exit laterally from therewithin and into the surrounding soil and which will permit for ease of cutting the laterally extending roots when the plant in the container is sold to the purchasing public. Also, no previous container has been developed which will permit for the formation of a water-soil slurry in the lower portion of the container to thus insure for a steady supply of the moisture to the plant which is within the container at a height therein slightly above the water-soil slurry in the lower portion of the container. Therefore, the primary object of the invention is to construct a plant growing receptacle which may be used effectively for an in-ground placement of the receptacle as well as an above ground placement of the receptacle and is so constructed as to provide in either case a source of moisture for the continued growth of the plant in the receptacle.

Another object of the invention is to construct a plant growing receptacle which will minimize the use of water to the plant in the receptacle while still maintaining a moist atmosphere within the same to insure the steady growth of the plant therein.

Another object of the invention is to provide an in-soil placed receptacle which will permit for the growth of the laterally extending roots which may be cut or sheared from above ground at the time of sale of the plant grown in the receptacle so as to permit for the easy removal of the plant from within the receptacle, when the receptacle is in an in-soil placement.

Another object of the invention is to provide a plant receptacle which will require a minimum of water to sustain the healthy growth of the plant contained therein.

Another object of the invention is to provide a receptacle for plants and the like which provides an effective means for allowing drainage from the plant receptacle to thus eliminate root rotting due to over watering.

A further object of the invention is to provide a receptacle for plants and the like that will allow quick and efficient nesting without orientation and will nest in such a way as to result in a stack that contains a large number of receptacles and that is easy to handle.

Another object of the invention is to provide light weight and inexpensive plant growing containers, preferrably formed of plastic which may be easily stored for convenient usage, and which also provide improved plant growing containers for extended use during plant growth.

Other and further objects, features and advantages of the present invention will be readily apparent to those skilled in the art upon the reading of the description of the preferred embodiments which follows when taken in conjunction with the accompanying drawings.

BRIEF DESCRIPTION OF THE DRAWINGS

FIG. 1 is a perspective view of the plant growing receptacle of the present invention showing a plant mounted therein.

FIG. 2 is a view taken on lines 2—2 of FIG. 1, looking in the direction of the arrows.

FIG. 3 is a side view of the plant growing receptacle in an in-soil planting position showing some of the roots extending outwardly from within the receptacle as well as the drain holes positioned above the denser portion of the water-soil slurry present in the lower portion of the receptacle.

FIG. 4 is a side view partially in section, of the plant growing receptacle showing the root exit opening as well as the drainage holes, both formed in the lower portion of the receptacle.

FIG. 5 is a section taken on lines 5—5 of FIG. 3, looking in the direction of the arrows, showing the receptacle in an in-ground placement of the receptacle.

FIG. 6 is a perspective view of the plant growing receptacle shown in an above ground position resting on an imperious liner placed thereunder.

FIG. 7 is a side view of an in-ground plant growing receptacle showing the laterally extending roots as well as a tool for cutting or shearing off the roots extending from the sides of the receptacle.

FIG. 8 is a top plan view showing in section, the watering means for the plants in the receptacles.

FIG. 9 is a perspective view shown in section, of rows of plant growing receptacles shown in-ground planting, in rows, the plant growing receptacles of the present invention.

FIG. 10 is a sectional view of one row of plant growing receptacles resting on an impervious liner thereunder.

DESCRIPTION OF THE PREFERRED EMBODIMENTS

Referring now to the drawings, wherein like reference numerals are employed to designate like parts throughout the several views, reference character 10 denotes the plant growing receptacle of the present invention. The receptacle is open at the top and may be formed in any known manner and includes side wall 11 tapering downwardly to a closed bottom wall 12. A conical shaped container is shown as it lends to easy nesting of the containers when not in use, although other shapes could be adapted providing they are capable of nesting with one another. The receptacles are preferably formed of a suitable plastic material as this material is easily formed to the desired configuration by well known molding methods. Opening 13 in the side wall 11 is positioned slightly above the drain openings 14, and the openings 14 allow for the drainage of water from within the container so as to prevent an over accumulation of water in the bottom of the receptacle which could cause root rot to the plant growing in the container.

While only one root exiting opening 13 is shown in side wall 11, as appears in FIGS. 3, 5, 6 and 7 of the drawings, additional exit openings 13 may be found in the side wall 11, provided these additional exit openings are arranged diametrically opposite the openings found in the side wall.

Also, a plurality of drain openings 14 may be formed in the side wall of the container and similarly located therein.

The growing medium in the container 10 may be a mixture of soil and a known fertilizer to enhance the growth of the plant in the container. Watering of the plant in the container will be described more fully hereinafter, but suffice to say that the water fed into the container will be in regulated amounts which will gravitate towards the bottom of the container and in so travelling will cause a small amount of soil within the receptacle to gravitate to the bottom of the container and thus form a water-soil solution in the bottom portion of the receptacle designated by the reference numeral 15 as shown more particularly in FIG. 5 of the drawings. This water-soil solution may be referred to as a thick slurry or a mud from which, by capilliary action, the moisture therein rises upwardly into the soil extending above the drain holes to thus provide for a moist atmosphere which will provide the moisture necessary to promote continued growth of the plant within the receptacle.

Formed along the upper portion of the receptacle are outwardly extending bulbous segments 16 which will limit the downward movement of the container so as to prevent the containers from sticking to one another when the containers are nested for storage when not in use.

Referring now particularly to FIGS. 3, 5 and 7, of the drawings, there is shown at 17, roots exiting through the openings 13 and into the surrounding soil into which the receptacle 10 has been placed for further growth of the plant therein. As may be appreciated, with the roots extending into the soil surrounding the receptacle, the receptacle is firmly anchored into the surrounding soil and the receptacle may not be easily removed from within the soil. When the plant has been sold to a customer, a workman at the nursery, using a sharp bladed instrument 18, in the nature of a hand shovel or the like, cuts off the roots, first on one side of the container where the roots extend into the surrounding soil. This, of course, causes shock to the plant but since the roots extending through the openings 13 formed diametrically opposite the opening from which the roots have been cut, will continue their lateral travel from within the container and into the surrounding soil. This will minimize shock to the plant. It is only when the plant has been sold and is to be removed from within the receptacle are the roots on the opposite side of the container to be cut. When this has been accomplished, the plant, along with the entrapped roots in the receptacle and the soil therein, may be lifted from the receptacle, being now in condition to be replanted by the purchaser in a soil opening formed to receive the transplant.

It is estimated that following the cutting of the laterally extending roots on one side of the container, a period of several weeks should elapse before cutting the roots on the opposite side of the container to thus minimize shock to the plant.

An indication 19 of some kind should be placed on the upper edge of the container so as to inform the workman at the nursery the location of the exit openings 13 formed in the lower portion of the receptacle when the same is employed in an in-soil placement of the container for further growth of the plant therein.

One manner of supplying water to the plants in the receptacle 10 is shown in part in FIG. 8 of the drawings. Here there is shown a main tubular pipe 20 located above ground and feeder lines 21 extend therefrom and over the containers 10 positioned therebelow. Suitable exit openings (not shown) extend from the feeder lines 21 and direct water into the said receptacles 10. The amount of water exiting from the feeder lines may be easily regulated by the operator of the nursery so as to prevent over watering of the plant which could result in root damage. As can be appreciated, the downward flow of irrigation water fed into the receptacle 10 will cause some of the soil within the receptacle to migrate towards the bottom of the receptacle to form a denser composition of soil and fertilizer at the bottom of the container. The advantage of having a denser composition of matter at the bottom of the container will be explained more fully hereinafter.

Thus far, I have shown and described a plant growing receptacle employed for in-soil planting of the receptacle.

I will now show and describe an embodiment of the invention which is directed to an above-ground placement of the receptacle for the growth of plants therein.

Shown in FIG. 10 of the drawings is a plurality of plant receptacles 10 placed on an impervious liner 22 comprising a sheet of plastic or like material. As shown in FIG. 8, a water supply line 20 and feeder lines 21 are utilized for irrigation of the plant within the receptacles. Feeder lines 21 are connected to supply line 20 through tubular connections 21'. Also, as described with reference to the irrigation system shown in FIG. 8, the amount of irrigation water supplied to the receptacle 10 may be regulated by the owner of the nursery so as to prevent over watering of the plant as well as to conserve on the amount of water used for watering the same. This distinguishes from overhead spraying of the containers for irrigation purposes. This is particularly true where the plant nursery covers an extensive area. This method of irrigation results in a great loss of water due to the feed of sprayed water in places where not needed or by evaporation of the sprayed water. As previously described, the irrigation water fed into the containers will form a denser composition of soil and water at the bottom of the receptacle insuring a constant supply of moisture to the plant and also adding weight to the container which will act as a ballast to prevent tipping of the receptacle with eventual loss of soil and fertilizer from within the receptacle due to high winds or accidental knocking over of the receptacle.

With reference to FIG. 10 of the drawings which disclose an above ground placement of the receptacles 10, any roots extending through the openings 13 will be air pruned as distinguished from in-ground placement of the containers where it becomes necessary to cut off the laterally extending roots before the plant can be lifted from the receptacles. Also, since the growing medium in the container comprises a mixture of soil and a suitable fertilizer, any tipping over of the receptacle will result in the spill on the ground of some of the fertilizer which could find it's way to a nearby source of water such as a stream, lake or the like and cause pollution of these waters. This applies particularly to the above-ground placement of the containers as shown in FIG. 10 of the drawings.

While I have described the receptacle as being molded from a suitable plastic material and consequently rigid, a flexible plastic container constructed as above-described may be as effectively used provided staying or bracing means are employed for keeping the receptacle top open when the mixture of soil and fertilizer are poured thereinto.

While preferred embodiments of the present invention have been shown and described for the purpose of the disclosure, numerous changes will suggest themselves to those skilled in the art, which changes are encompassed within the spirit of this invention as defined by the appended claims.

What is claimed is:

1. A plant growing receptacle having a plant positioned therein for further growth said receptacle comprising an open top and a side wall extending downwardly to a closed bottom wall, a first root exiting opening formed in said side wall at a distance above said bottom wall, drain openings formed in said side wall intermediate said root exiting opening and said closed bottom wall, a wall portion extending between said drain openings and said closed bottom wall having no openings therein and with said bottom wall being capable of retaining water, a source of water for irrigating said plant in said receptacle, said source extending over the upper open end of said receptacle, a mixture of soil and fertilizer placed within said receptacle to promote further growth of the plant therein, said irrigating regulated as to allow feeding of water to the upper portion only of the receptacle and to the mixture of said soil and fertilizer therein, said water gravitating towards the bottom of said container and in its travel toward the bottom of the container some of the water, soil and fertilizer gravitating towards the bottom of the receptacle to there form a slurry of water, soil and fertilizer thereon, intermediate the said drain openings and bottom of said receptacle thus providing a moist environment within the receptacle.

2. The receptacle of claim 1 wherein a plurality of root exiting and drain openings are provided in said side wall of said receptacle, the said root exiting and drain openings located diametrically opposite one another in the said side walls.

3. The receptacle of claim 1 wherein irrigation water is supplied to said receptacle through conduits extending over and resting on the upper edge of said receptacle.

4. The receptacle of claim 1 wherein said receptacle is in an above-ground placement for continued further growth of the plant mounted therein.

5. The structure of claim 1 wherein the water-soil-fertilizer slurry formed in the lower portion of the receptacle will add weight thereto and serve as a ballast for the said receptacle thereby avoiding accidental tipping of the container.

6. The method of growing plants in a receptacle as defined in claim 1 having a moisture releasing mass in the lowermost portion of the receptacle, openings in the lower portion of the receptacle for the exit of roots of the plant as well as the exit from therewithin for the irrigating water fed to the receptacle, the roots extending from the exit openings formed in one wall of the receptacle being cut before the roots extending from the openings formed in the opposite wall are cut so as to permit for the removal of the plant from within the receptacle.

* * * * *